(12) United States Patent
Yau

(10) Patent No.: US 10,277,576 B1
(45) Date of Patent: Apr. 30, 2019

(54) DIAMETER END-TO-END SECURITY WITH A MULTIWAY HANDSHAKE

(71) Applicant: Syniverse Technologies, LLC, Tampa, FL (US)

(72) Inventor: Edward Yau, Hong Kong (CN)

(73) Assignee: Syniverse Technologies, LLC, Tampa, FL (US)

( * ) Notice: Subject to any disclaimer, the term of this patent is extended or adjusted under 35 U.S.C. 154(b) by 0 days.

(21) Appl. No.: 16/021,763

(22) Filed: Jun. 28, 2018

Related U.S. Application Data

(60) Provisional application No. 62/526,625, filed on Jun. 29, 2017.

(51) Int. Cl.
| | |
|---|---|
| *G06F 7/04* | (2006.01) |
| *H04L 9/32* | (2006.01) |
| *H04L 9/00* | (2006.01) |
| *H04L 29/06* | (2006.01) |

(52) U.S. Cl.
CPC .............. *H04L 63/08* (2013.01); *H04L 63/10* (2013.01); *H04L 67/42* (2013.01)

(58) Field of Classification Search
CPC .......... H04L 63/08; H04L 63/10; H04L 67/42
USPC .................. 726/4, 5, 26; 713/168, 170, 176; 380/262
See application file for complete search history.

(56) References Cited

U.S. PATENT DOCUMENTS

| | | | |
|---|---|---|---|
| 7,079,499 B1 | 7/2006 | Akhtar et al. | |
| 7,197,639 B1* | 3/2007 | Juels | H04L 63/08 380/277 |
| 7,801,826 B2 | 9/2010 | Labrou et al. | |
| 7,904,725 B2 | 3/2011 | Pavlicic | |
| 8,086,859 B2 | 12/2011 | Pavlicic | |
| 2018/0198764 A1* | 7/2018 | Kumar | H04L 63/0428 |

* cited by examiner

*Primary Examiner* — Aravind K Moorthy
(74) *Attorney, Agent, or Firm* — Andriy Lytvyn; Smith & Hopen, P.A.

(57) ABSTRACT

A method of enhancing end-to-end security of the Diameter protocol. A client transmits a Request message to the server. The request message has a signature, which is generated by encrypting a hash result calculated by the client using predefined AVPs of the Request message. The server validates the signature by independently calculating the hash result and determining whether the hash result within the signature matches the calculated result. Upon successful validation of the signature, the server transmits an Answer message to the client. The Answer message contains a nonce value and a request for Authenticator message from the client. The client transmits an Authenticator message having a second signature based on the hash result calculated using the nonce. The server compares the received hash result with the calculated hash result. If there is a match, the server updates the information requested in the Request message.

20 Claims, 6 Drawing Sheets

DIAMETER END-TO-END SECURITY WITH A MULTIWAY HANDSHAKE

PRIORITY CLAIM

This non-provisional application claims priority to U.S. Provisional Patent Application No. 62/526,625 filed Jun. 29, 2017, entitled "Diameter End-to-End Security with Time-Based Signature," which is incorporated herein by reference.

BACKGROUND OF THE INVENTION

1. Field of the Invention

This invention relates to the field of telecommunications. More specifically, it relates to a method of enhancing end-to-end security of Diameter signaling messages by using a nonce-based signature with multiway handshake method.

2. Brief Description of the Related Art

Diameter is an authentication, authorization, and accounting protocol for communication networks. Diameter protocol is widely-used in LTE technologies, such as for mobility services, policy management, accounting and charging. Diameter protocol enables many-to-many communications between Diameter nodes (e.g. each operator has many roaming partners). Diameter protocol involves transaction-based communications using a single-message exchange. These messages usually traverse through multiple nodes, at least some of which may be vulnerable to attacks.

Because Diameter protocol is integral to LTE communication technologies, high end-to-end security is paramount. However, Diameter protocol (RFC3588/RFC6733) has no built-in security against spoofing and malicious attacks and, therefore, often relies on IP and transport-layer security. One specific concern is protecting messages against spoofing. A common technique for combating spoofing involves generating a signature using cryptographic hash function based on specific AVPs, such as Origin-Host, Origin-Realm, and Session-ID. The deficiency of this approach is that it does not protect against a replay attack: an intruder may copy the content of a legitimate message with its specific-AVPs and the signature, and re-generate another message using the same set of specific-AVPs and the signature. The modified message would pass the authentication challenge because the signature and the AVPs, on which the signature is based, would be the same, even if the attacker replaces the content of other AVPs There are several approaches aimed at protecting against replay attacks. One such approach is a signature-based security measure with a time element. The time element is critical to ensure that the message body always has a variation of content in different time, and thus cannot be "replayed" again at a later time. The major problem of this scheme is that the time of each server may be different due to different time references used by those servers. To cope with this time difference, a certain degree of tolerance must be allowed. Depending on the actual time difference between the client and servers, this tolerance may be in the magnitude of minutes. A high tolerance, however, introduces a risk that a message can be replayed within the tolerance period. One possible solution to this problem is programming the server to record the "clock skew" of the client peer to reduce the tolerance. However, this scheme would require the server to store the dynamic value of this "clock skew" in its peer profile, which can be undesirable.

Therefore, what is needed is a practical method that effectively provides an end-to-end security in Diameter protocol against spoofing and replay attacks.

SUMMARY OF THE INVENTION

The invention is a method of enhancing end-to-end security of the Diameter protocol. A client generates a hash algorithm using Diameter AVP as inputs. A digital signature for the Request message is generated by encrypting the hash result. The client transmits the Request message to the server (first handshake). The server independently calculates a hash result for the Request message using the same inputs and the same hash algorithm as the client. The server retrieves the hash calculated by the client by decrypting the digital signature and compares the two hash results to ensure that they match. In the next step, the server generates a one-time random value "nonce," which the server transmits to the client in an Answer message. The Answer message has an Attribute Value Pair (AVP) indicating the need for Authenticator message to be transmitted from the client to the server (second handshake). The client then generates another hash value using the same inputs as the first hash and the nonce value. A digital signature for the message is generated by encrypting the hash result. The client transmits a new type of Diameter message, herein referred to as an "Authenticator" message to the server (third handshake). The server independently calculates a hash result for the message using the same inputs, including nonce, and the same hash algorithm as the client. The server retrieves the hash calculated by the client by decrypting the digital signature and compares the two hash results to ensure that they match. If there is a match, the server will perform its update as per the original Request message.

If the transaction is a 'Get' type of transaction where an application information response is expected, the server will send a new type of Diameter message 'Authentication-Response' that carries the application information (fourth handshake). This fourth handshake message is not needed if the Diameter transaction is an 'Update' type of transaction where no application information is needed to be returned to the client, in which case the flow steps at the third handshake message.

BRIEF DESCRIPTION OF THE DRAWINGS

For a fuller understanding of the invention, reference should be made to the following detailed disclosure, taken in connection with the accompanying drawings, in which.

DETAILED DESCRIPTION OF THE PREFERRED EMBODIMENT

Figure 1:
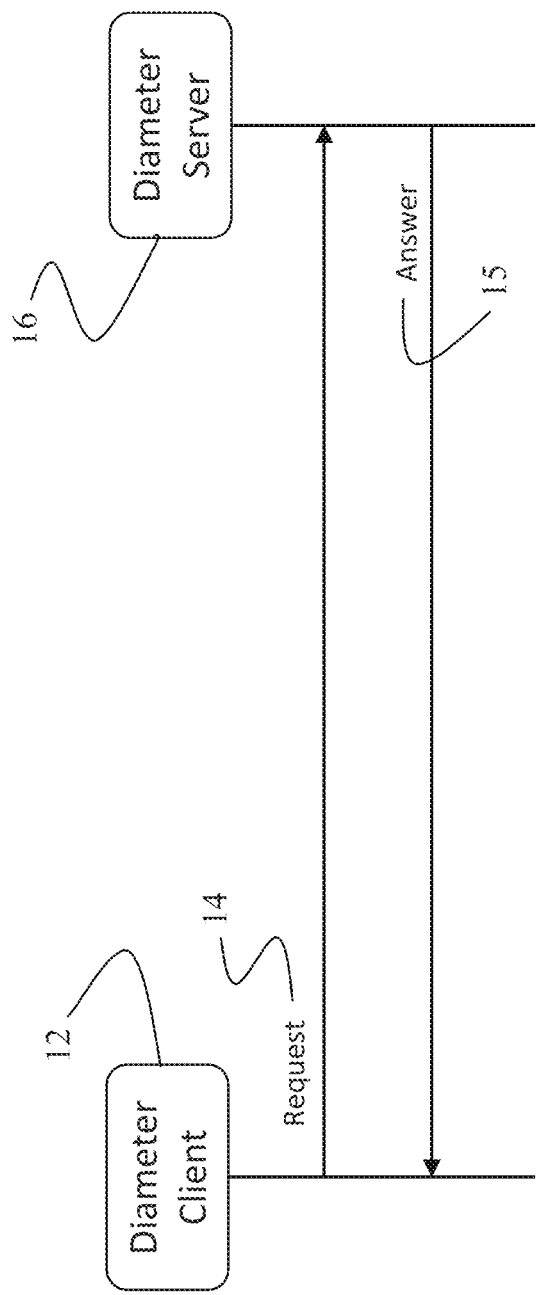
FIG. 1 is a diagram schematically depicting the default Request-Answer scheme of the Diameter protocol.

FIG. 1 shows a standard Diameter request-response pair as defined in RFC3588/RFC6733. In this scheme, Diameter client 12 sends Request message 14 to Diameter server 16, and Diameter server 16 sends an Answer message 15 to Diameter client 12. An end-to-end ID is used to identify the request/answer pair. A major flaw of this default Diameter authentication scheme is that it is susceptible to a replay attack. The present invention addresses this issue by providing a novel and non-obvious method described below that safeguards against replay attacks by providing a multi-tier authentication scheme illustrated in FIGS. 2-3.

The invention introduces a new authentication scheme using new types of Diameter message named "Authenticator" 30 and "Authentication-Response" 32. This new scheme changes the Diameter communications from a default 2-way handshake (response/answer) scheme to an intelligent scheme in which server 16 selects the level of end-to-end security appropriate for each transaction. Server 16 makes a determination as to whether a 2-way, a 3-way (request/answer/authenticator) or a 4-way (request/answer/authenticator/authenticator-response) handshake should be used for a particular transaction.

The first stage of the authentication scheme is the same for both the 3-way and the 4-way handshake. The invention increases end-to-end security of Diameter protocol by providing a message authenticity verification method. Diameter client 12 sends Request message 14 to Diameter server 16. Request message 14 has an encrypted signature 18 to protect integrity and ensure authenticity.

When sending message 14, Diameter client 12 generates electronic encrypted signature 18 by performing the following steps. First, Diameter client 12 executes a hashing algorithm to find a hash result 20 of message 14, or of predefined message AVPs. Examples of hashing algorithms include, but are not limited to Secure Hash Algorithm (SHA), SHA-2, Message Digest Algorithm (MDA), and Race Integrity Primitives Evaluation Message Digest (RIPEMD). Execution of the hashing algorithm on the digital data yields hash result 20, herein referred to as a "hash." In an exemplary embodiment, the inputs into the hashing algorithm are Origin-Host, Origin-Realm, Session-ID:

Hash1=SHA-2(Origin-Host,Origin-Realm,Session-ID)

In other embodiments, different AVPs may be used as inputs into the hash algorithm without deviating from the principles of the invention.

In other embodiments, the entire Diameter message may be used as an input into the hash algorithm without deviating from the principles of the invention.

The Diameter client 12 generates signature 18 by encrypting the hash result 20 using a private key 22. Both symmetric and asymmetric encryption methods are possible. For symmetric encryption, the same shared secret key is used for encryption and decryption. While in asymmetric encryption, the client encrypts the hash 20 using private-key 22, and a public key 24 is used to decrypt signature 18:

Signature=Encrypt(Hash1,private-key).

Next, Diameter server 16 authenticates Request message 14 received from the Diameter client 12 by executing the following steps. In step 104, Diameter server 16 calculates a result of the hashing algorithm using the same inputs that were used by Diameter client 12:

Hash2=SHA-2(Origin-Host,Origin-Realm,Session-ID).

Figure 4:
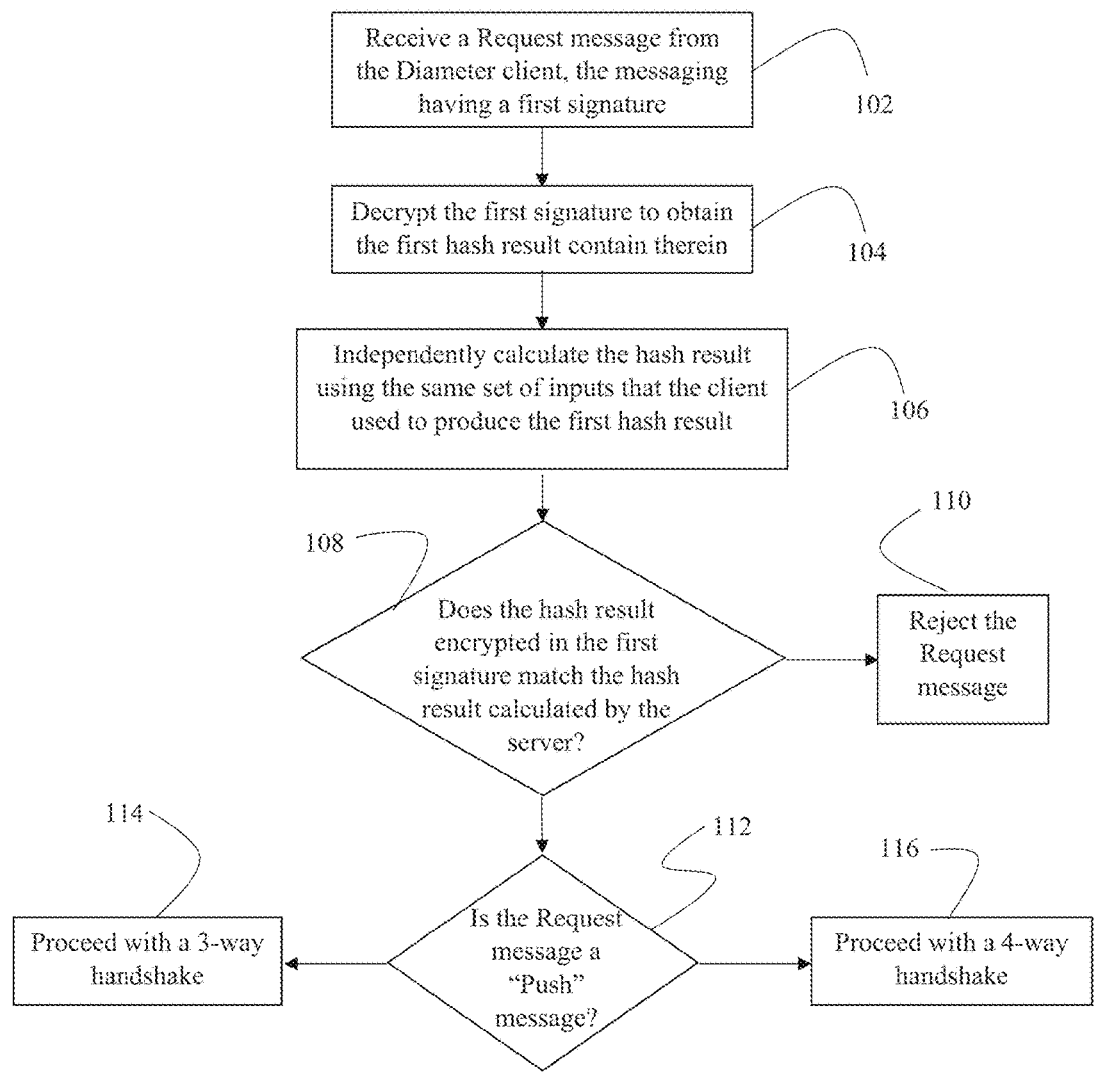
FIG. 4 is a flow chart depicting the first stage of the multiway handshake.

The first stage of the multi-tier authentication scheme described above is illustrated in the flowchart of FIG. 4. In step 102, Diameter server 16 receives Request message 14 from Diameter client 12, wherein Request message 14. In step 104, Diameter server 16 decrypts signature 18 of the received Request message 14 using the provided public key 24. The decryption yields hash result 20 that was calculated by the client:

Hash1=Decrypt(Signature,public-key).

In step 106, Diameter sever 16 calculates hash 26 (Hash2) using the same inputs that client 12 used to calculate first hash 20. In step 108, server 16 compares calculated hash 26 (Hash2) with the hash 20 that was calculated and transmitted by client 12 (Hash1). If there is a match, Diameter server 16 proceeds to the next validation step 112, which is described in more detail below. Otherwise, if calculated hash 26 (Hash2) and received hash 20 (Hash1) do not match, message 14 is rejected in step 110.

After Diameter server 16 validates signature 18 by verifying that hash result 20 encrypted within signature 18 matches calculated hash 26, server 16 proceeds with the second tier of the multi-tier authentication scheme. To protect against a replay attack, the invention introduces a new Diameter message handshake.

In step 112, Diameter transaction requested in Request message 14 is classified as either a "Push" transaction or a "Get" transaction. "Push" transactions are those, in which a client intends to update information at the server, while "Get" transactions are those, in which the client intends to retrieve information from the server. If the intent of a transaction is to both Push and Get, the transaction is treated as a "Get" transaction. If the transaction is classified as a Push transaction, the authentication method proceeds in accordance with a 3-way handshake scheme in step 114. Otherwise, the method precedes in accordance with a 4-way handshake scheme in step 116.

Figure 2:
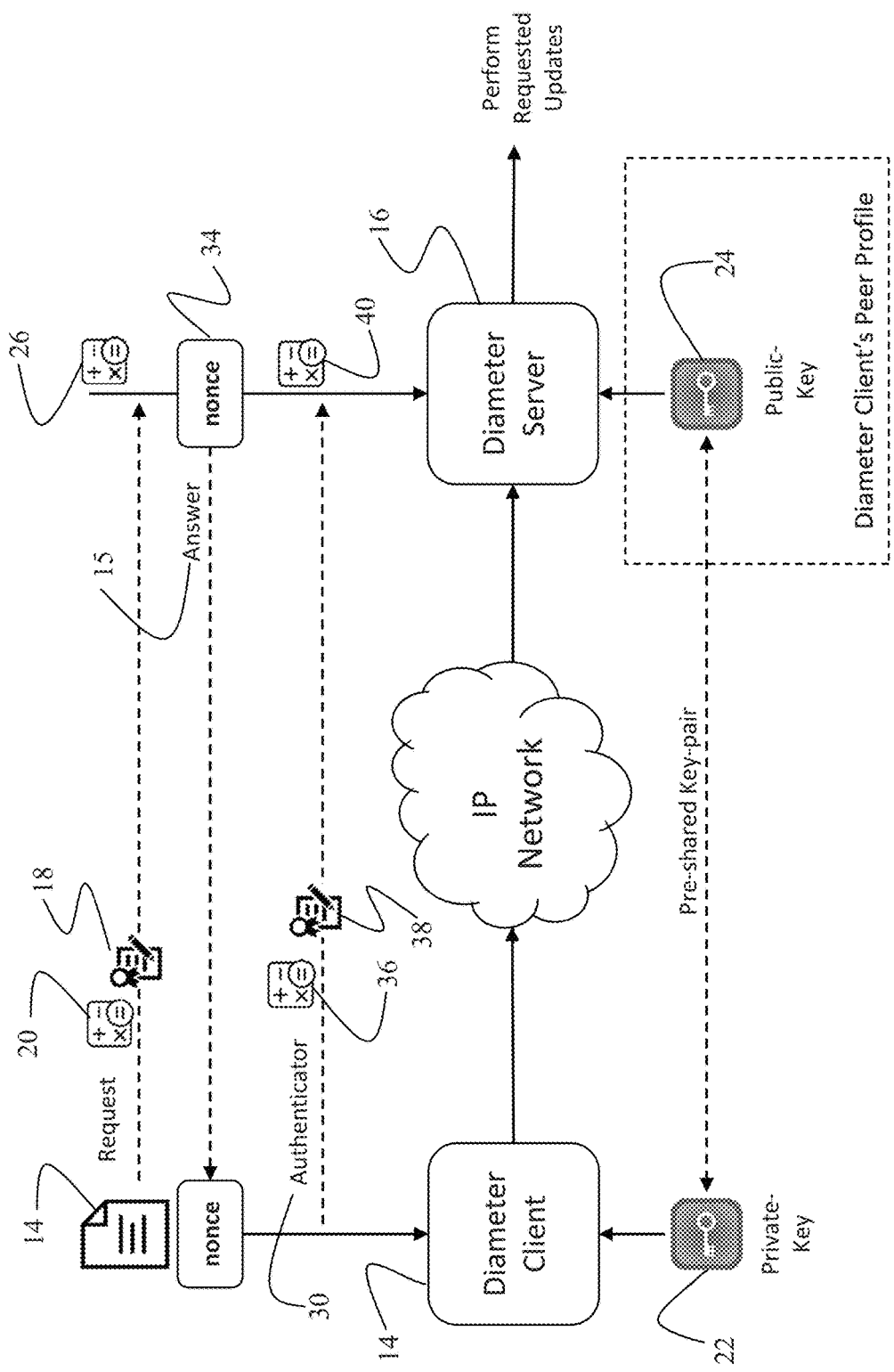
FIG. 2 is a diagram schematically depicting the method of enhanced end-to-end security for Diameter Push messages.
Figure 3:
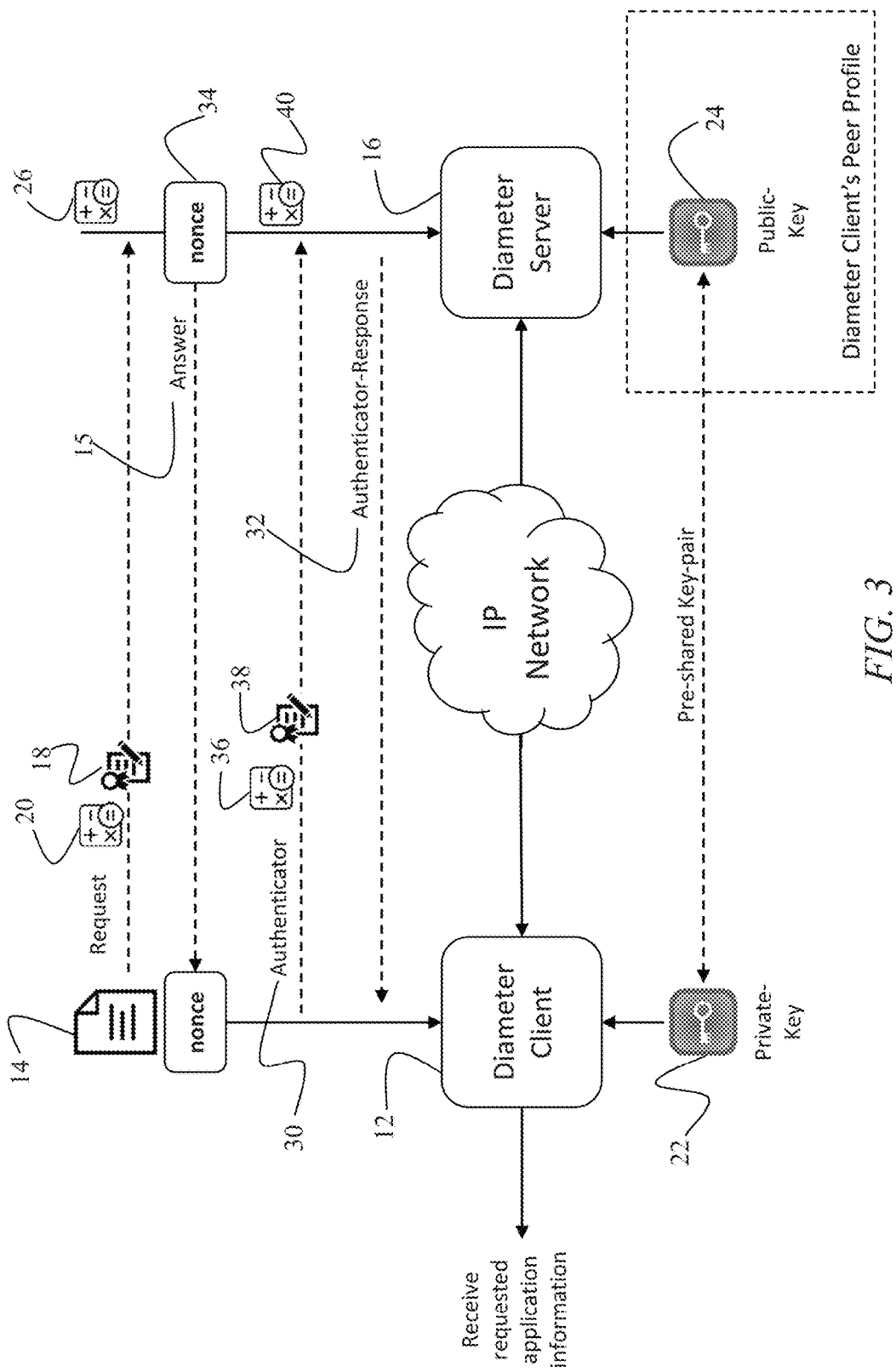
FIG. 3 is a diagram schematically depicting the method of enhanced end-to-end security for Diameter Get messages.
Figure 5:
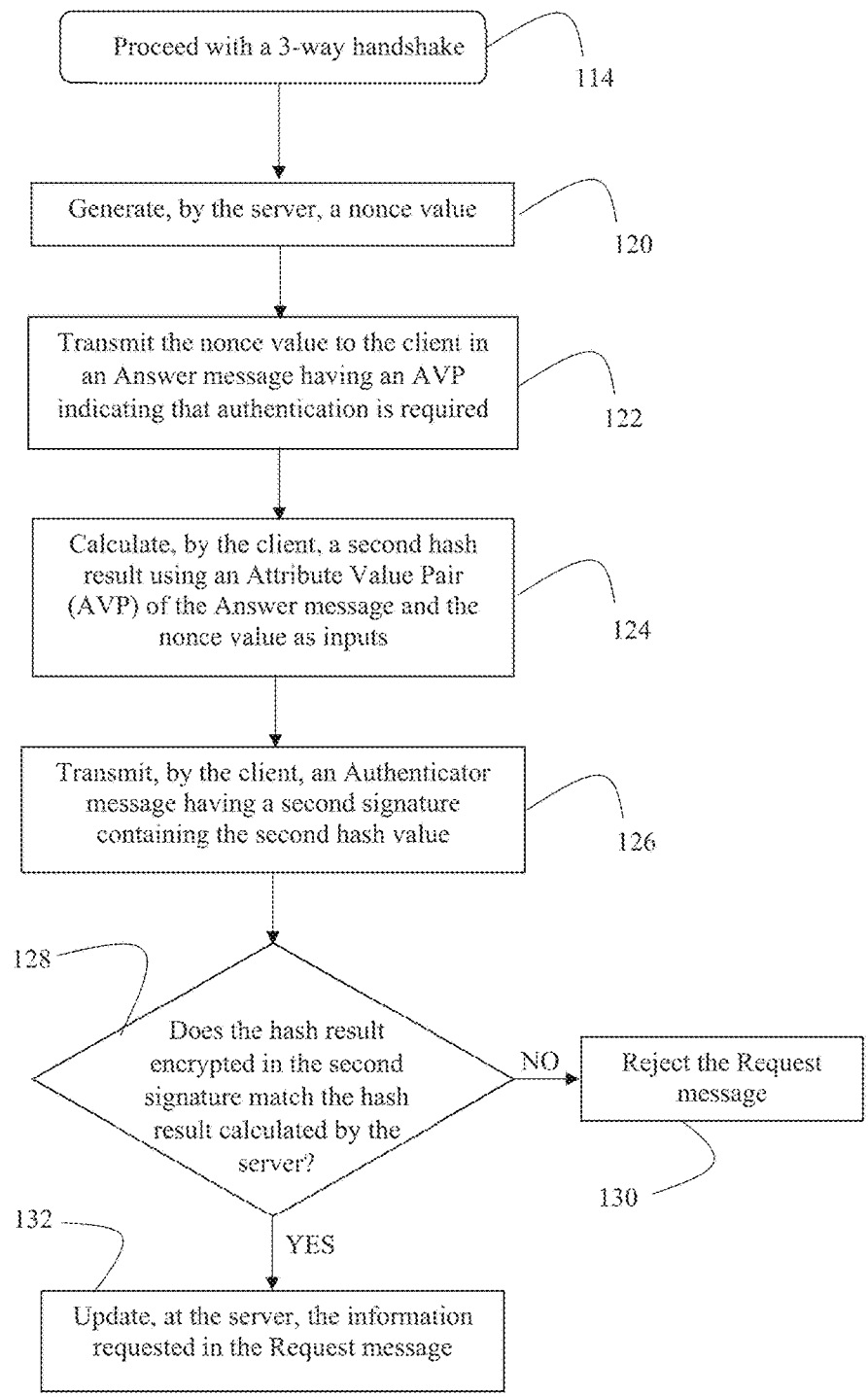
FIG. 5 is a flow chart depicting the second and third stages of a 3-way handshake used for Push messages.

FIG. 5 depicts the second and third stages of the multi-tier authentication scheme in the 3-way handshake, which is initiated in step 118. As illustrated in FIG. 2, after validating Request message 14, server 16 proceeds to the next stage of the 3-way handshake, in which the "Authenticator" message 30 is used to prevent replay-attack in a Diameter "Push" request. As shown in FIG. 5, after verifying signature 18, server 16 generates a one-time, random number known as "nonce" 34 in step 120. In step 122, server 16 sends nonce 34 in Answer message 15 to client 12. In addition to carrying nonce 34, Answer message 15 contains an AVP that indicates "authenticator needed." In step 124, responsive to receiving Answer message 15, client 12 calculates a second hash 36 result using predefined AVPs and nonce 34 as inputs. Then, client 12 generates a second signature 38 by encrypting second hash result 36. In step 126, client 12 packs second signature 38 in an "Authenticator" message 30, and sends "Authenticator" message 30 to server 16. In step 128, server 16 verifies second signature 38 by decrypting second signature 38 and comparing second hash result 36 contained therein against second calculated hash result 40 independently calculated by server 16 using the same input AVPs and nonce 34. If second hash result 36 transmitted by client 12 and calculated hash result 40 do not match, Request message 14 is rejected in step 130. Otherwise, if there is a match, second signature 38 is verified, and server 16 performs the updates that client 12 requested in Request message 14 in step 132.

Figure 6:
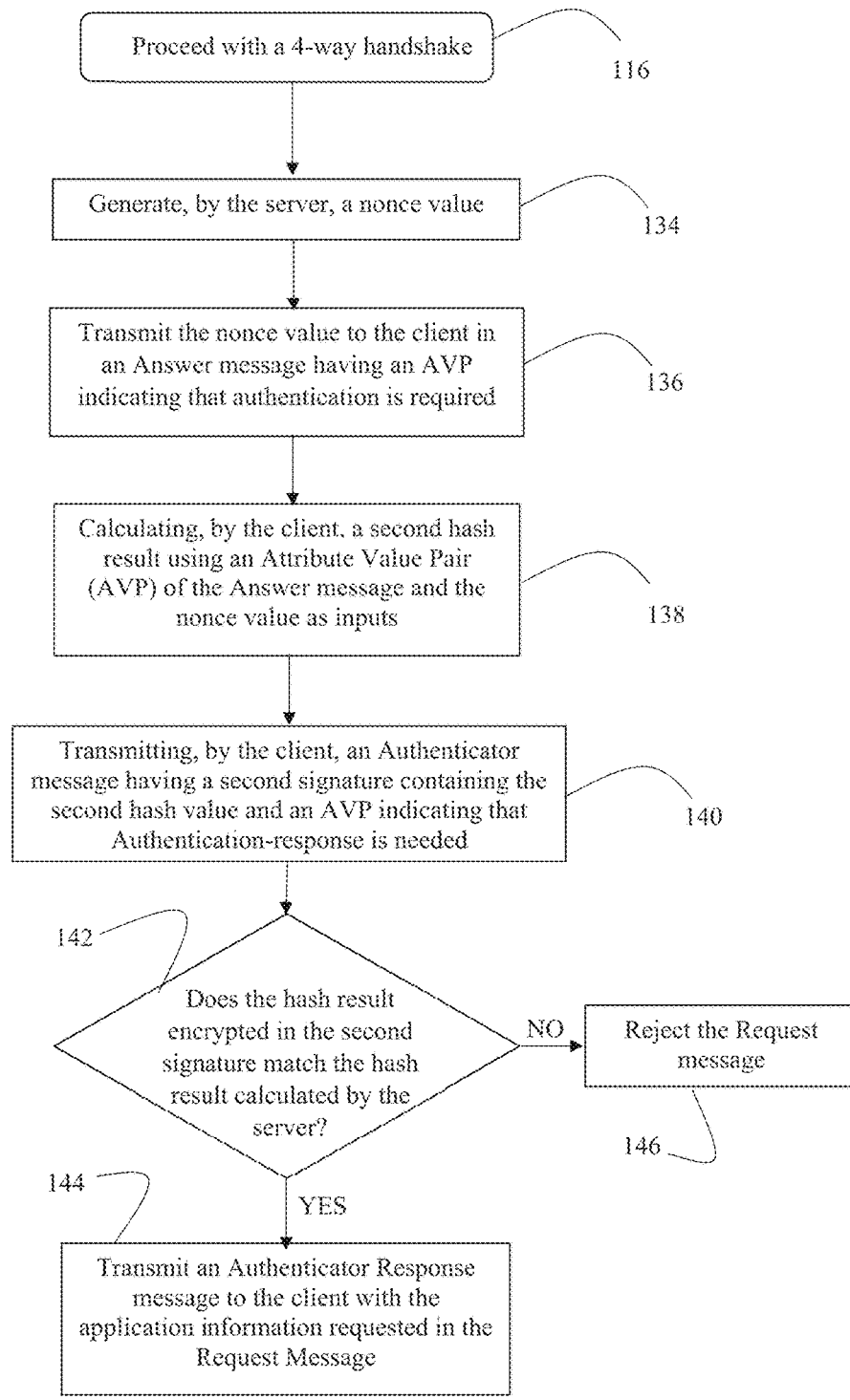
FIG. 6 is a flow chart depicting the second, third, and fourth stages of a 4-way handshake used for Get messages.

FIG. 6 depicts the second, third, and forth stages of the 4-way handshakes, which involve "Authenticator" message 30 and "Authenticator-response" message 32 to safeguard against replay-attacks in Diameter "Get" transactions. After receiving Request message 14 and verifying signature 18

(refer to FIG. 4), FIG. 6 shows that server 16 generates nonce 34 in step 134. In step 136, server 16 transmits Answer message 15 to client 12. Answer message 15 does not contain the application information that client 12 requests. Instead, Answer message 15 carries nonce value 32 and contains an AVP indicating that Authenticator is needed. In step 138, upon receipt of the Answer message 15, client 12 generates second signature 38 by calculating second hash result 36 using message AVPs and nonce 34 as inputs. In step 140, client 12 packs second signature 38 in Authenticator message 30, and sends Authenticator message 30 to server 16. The Authenticator message 30 contains an AVP indicating that Authentication-response 32 is needed from server 16. In step 142, server 16 then verifies second signature 38. Only when second signature 38 has been verified, server 16 sends "Authentication-response" message 32 with application information requested in message 14 to client 12 in step 144. Otherwise, if second hash result 36 does not match calculated hash result 40, server 16 rejects Request message 12 in step 146.

'Authenticator-needed' AVP can be defined as following:
 [c1] Authenticator-Needed AVP=GroupedAVP ('Authenticator-Needed flag', 'nonce')

'Authenticator-response-needed' AVP can be defined as following:
 [c1] Authenticator-Response-Needed AVP=GroupedAVP ('Authenticator-Response-Needed flag', 'Authenticator-Signature')

Authenticator-Signature=Encrypt (Authenticator-Hash, private-key).

Authenticator-Hash=SHA-2 (Origin-Host, Origin-Realm, Session-ID, nonce)

Verification of Authentication-hash by Diameter server is accomplished using the verification method disclosed above.

Reserved bits in Diameter headers are used to indicate 'Authenticator' and 'Authenticator-Response' messages:
 [c1] Bit 0: R(equest) as per RFC3588/6733
 [c2] Bit 1: P(roxy) as per RFC3588/6733
 [c3] Bit 2: E(rror) as per RFC3588/6733
 [c4] Bit 3: T(Potentially retransmitted message) as per RFC3588/6733
 [c5] Bit 4: A(uthenticator) as per the present invention
 [c6] Bit 5: R(equest) as per RFC3588/6733
 [c7] Bit 6: R(equest) as per RFC3588/6733
 [c8] Bit 7: R(equest) as per RFC3588/6733

Combination of 'R(equest)' and 'A(uthenticator)' bit gives the following (new) definition of Diameter messages:
 [c1] Request (=1) & Authenticator (=0): request (from client to server)
 [c2] Request (=0) & Authenticator (=0): answer (from server to client)
 [c3] Request (=1) & Authenticator (=1): authenticator (from client to server)
 [c4] Request (=0) & Authenticator (=1): authenticator response (from server to client)

The above definition will pass through any Diameter Routing Agents (DRA) that do not support the new definition since DRA will only examine the R(equest) bit to determine if the message flows from client to server (request), or server to client (answer).

Unlike typical challenge-response scheme which always requires 4-way handshake (get-challenge/challenge/request/answer), the present invention needs only 3-way handshake for 'Push' transactions, which are the most common Diameter transaction type in many applications. This saves a significant amount of overhead that needs to be introduced into the network for protection against replay-attack.

Another advantage of the present invention is that server 16 makes a determination as to whether authenticator is needed. Server may choose to 1) skip the security check and ignore the signature AVP in the request and handles the request without security, 2) perform the signature validation for authenticity and integrity check but skip the replay-attack protection, which is common for use cases where replay-attack is not a concern, 3) perform signature validation for authenticity and integrity check and mandate replay-attack protection by sending answer that requires an Authenticator message 30.

Another advantage of the present invention is it is fully backward compatible. Diameter clients may implement this scheme without support from all servers, and servers can implement this scheme without support from all clients. Servers can enable the scheme only when the signature AVP is received, which means the client supports this scheme. This method allows gradual roll-out of new clients and servers in a network with many client and server nodes.

Some of the advantages of the invention disclosed above are as follows: the disclosed method protects against spoofing with message signature and, therefore, is an effective method to guard against a replay-attack. The invention adds minimal overhead to message contents. Only one message is used to carry the authenticator in case of 'Push' transactions, and two messages are needed to carry the authenticator in case of 'Get' transactions. The signature may be based on various other AVPs as needed. The invention enables stateless signature generation and verification. Furthermore, the invention supports symmetric and asymmetric key algorithms for signature. Support for many-to-many communications using Public-Key-Infrastructure is also provided. Finally, the message is fully compliant to RFC3588/RFC6733 and therefore is able to traverse any number of DRA nodes without risking being improperly rejected by the server due to modifications made by the DRA nodes.

Both Diameter client 12 and server 16 may dedicate this end-to-end security functionality to another Diameter entity, including but not limited to Diameter Edge Agent (DEA), Diameter Routing Agent (DRA), Diameter Proxy and Diameter Firewall. In many deployments, a DEA is deployed in an operator's network edge and acts as a frontend of internal Diameter nodes for external communications. Dedicating the security functionality to DEA avoids the need for every internal Diameter node to be enhanced to support this implementation. DEA is located within an operator's premise and is considered to be in the same trusted domain as internal Diameter nodes. Thus, end-to-end security is still achieved.

Hardware and Software Infrastructure Examples

The present invention may be embodied on various platforms. The following provides an antecedent basis for the information technology that may be utilized to enable the invention.

Embodiments of the present invention may be implemented in hardware, firmware, software, or any combination thereof. Embodiments of the present invention may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. Further, firmware, software, routines, instructions may be described herein as performing certain actions. However, it should be appreciated that such descriptions are merely for convenience and that such actions in fact result from computing devices, processors, controllers, or other devices executing the firmware, software, routines, instructions, etc.

The machine-readable medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any non-transitory, tangible medium that can contain, or store a program for use by or in connection with an instruction execution system, apparatus, or device.

A machine-readable signal medium may include a propagated data signal with machine-readable program code embodied therein, for example, in baseband or as part of a carrier wave. Such a propagated signal may take any of a variety of forms, including, but not limited to, electromagnetic, optical, or any suitable combination thereof. A machine-readable signal medium may be any machine-readable medium that is not a computer readable storage medium and that can communicate, propagate, or transport a program for use by or in connection with an instruction execution system, apparatus, or device. However, as indicated above, due to circuit statutory subject matter restrictions, claims to this invention as a software product are those embodied in a non-transitory software medium such as a computer hard drive, flash-RAM, optical disk or the like.

Program code embodied on a machine-readable medium may be transmitted using any appropriate medium, including but not limited to wireless, wire-line, optical fiber cable, radio frequency, etc., or any suitable combination of the foregoing. Machine-readable program code for carrying out operations for aspects of the present invention may be written in any combination of one or more programming languages, including an object-oriented programming language such as Java, C#, C++, Visual Basic or the like and conventional procedural programming languages, such as the "C" programming language or similar programming languages.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by machine-readable program instructions.

Glossary of Claim Terms

Answer message—a Diameter message transmitted from the server to the client in response to the server receiving and validating the Request message.

Attribute Value Pair (AVP)—a part of a Diameter message used to encapsulate routing, authentication, authorization, and accounting information.

Authenticator message—a Diameter message transmitted from the client to the server containing a hash result calculated by the client, wherein the hash result is calculated using a nonce value provided to the client by the server as one of the inputs into the hashing algorithm.

Client—a computer program or device that accesses a service made available by a server.

Digital signature—an encrypted hash result that is transmitted within a Diameter message.

Hash value—a numeric value of a fixed length that uniquely identifies data that was used an input into the hashing algorithm.

Nonce value—a random number generated by the server.

Private key—a cryptographic key that is only known to the client and is used by the client to generate a digital signature by encrypting a hash result.

Public key—a cryptographic key used by the server to decrypt digital signatures generated by the client using a private key.

Push message—a type of a Request message that requests an update of information at the server.

Request message—a Diameter message transmitted from the client to the server requesting either an update of information at the server or requesting an application information response from the server.

Server—a computer program or device that provides for other programs or devices, called clients.

Three-way handshake—a Diameter transaction comprising the following messaging sequence: Request-Answer-Authenticator.

The advantages set forth above, and those made apparent from the foregoing disclosure, are efficiently attained. Since certain changes may be made in the above construction without departing from the scope of the invention, it is intended that all matters contained in the foregoing disclosure or shown in the accompanying drawings shall be interpreted as illustrative and not in a limiting sense.

What is claimed is:

1. A method of validating a message transmitted from a client to a server via a Diameter protocol comprising the steps of:
   receiving a Request message from the client, the Request message having a digital signature and an Attribute Value Pair (AVP);
   responsive to the Request message requesting an update of information at the server, classifying the Request message as a Push message;
   validating, by the server, the digital signature of the Request message transmitted by the client;
   responsive to successful validation of the digital signature and classifying the Request message as the Push message, proceeding with second and third stages of a three-way handshake between the client and the server, the second and third stages of the three-way handshake comprising the steps of:
   generating a nonce value by the server;
   transmitting an Answer message to the client, the Answer message carrying the nonce value and containing an indicator requesting an Authenticator message from the client;
   receiving, from the client, an Authenticator message carrying a first hash result calculated by the client using the nonce value and the AVP of the Request message as inputs;

comparing the first hash result received in the Authenticator message with a second hash result calculated by the server using the nonce value and the AVP of the Request message as inputs; and responsive to the first hash result matching the second hash result, updating, at the server, the information requested in the Request message.

2. The method of claim 1, wherein the digital signature is generated by encrypting a third hash result calculated using an input selected from the group consisting of an Origin-Host AVP, an Origin-Realm AVP, and a Session-ID AVP of the Request message.

3. The method of claim 2, wherein the first and the third hash results are calculated using the same AVPs of the Request message as inputs into a hash algorithm.

4. The method of claim 1, wherein the digital signature is generated using a private key and is decrypted using a pre-shared public key.

5. The method of claim 1, wherein the step of validating the digital signature further comprises the steps of:

decrypting the digital signature to obtain a third hash result calculated by the client;

calculating a fourth hash result based on AVPs of the Request message used by the client to calculate the third hash result;

comparing the third and fourth hash results; and validating the digital signature responsive to a match between the third and fourth hash results.

6. The method of claim 1, wherein the AVP of the Answer message used to calculate the first hash is selected from the group consisting of an Origin-Host AVP, an Origin-Realm AVP, and a Session-ID AVP.

7. The method of claim 1, wherein the first hash result received at the server is encrypted, by the client, using a private key and is decrypted, by the server, using a pre-shared public key.

8. The method of claim 1, wherein the indicator within the Answer message requesting the Authenticator message is established by setting a Diameter Header Request bit (bit-0) to 1 and an authenticator bit (bit-4) to 1.

9. The method of claim 1, wherein the indicator for the Authenticator message and the nonce are transmitted in a grouped AVP within the Answer message.

10. The method of claim 1, wherein the first hash result is encrypted within the Authenticator message.

11. A non-transitory computer-readable medium storing a program including instructions that, when executed by a processor, causes a Diameter server to perform the steps comprising:

responsive to receiving a Request message from the client, the Request message having a first digital signature and an Attribute Value Pair (AVP), classifying the Request message as a Push message if the Request message is a request to update information at the server;

validating the first digital signature of the Request message transmitted by the client;

responsive to successful validation of the first digital signature and classifying the Request message as the Push message, generating a nonce value and transmitting an Answer message to the client, the Answer message carrying the nonce value and containing an indicator requesting an Authenticator message from the client;

responsive to receiving, from the client, an Authenticator message having a second digital signature, validating the second digital signature by comparing a first hash result calculated by the client with a second hash result calculated by the server, wherein both the first and the second hash results are calculated using the nonce value and the AVP of the Request message as inputs; and responsive to the first hash result matching the second hash result, updating the information requested in the Request message.

12. The method of claim 11, wherein the first digital signature is generated by encrypting a third hash result calculated using an input selected from the group consisting of an Origin-Host AVP, an Origin-Realm AVP, and a Session-ID AVP of the Request message.

13. The method of claim 12, wherein the first and the third hash results are calculated using the same AVPs of the Request message as inputs into a hash algorithm.

14. The method of claim 11, wherein the first digital signature is generated using a private key and is decrypted using a pre-shared public key.

15. The method of claim 11, wherein the step of validating the first digital signature further comprises the steps of:

decrypting the first digital signature to obtain a third hash result calculated by the client;

calculating a fourth hash result based on AVPs of the Request message used by the client to calculate the third hash result;

comparing the third and fourth hash results; and validating the first digital signature responsive to a match between the third and fourth hash results.

16. The method of claim 11, wherein the AVP of the Answer message used to calculate the first hash is selected from the group consisting of an Origin-Host AVP, an Origin-Realm AVP, and a Session-ID AVP.

17. The method of claim 11, wherein the first hash result received at the server is encrypted, by the client, using a private key and is decrypted, by the server, using a pre-shared public key.

18. The method of claim 11, wherein the indicator within the Answer message requesting the Authenticator message is established by setting a Diameter Header Request bit (bit-0) to 1 and an authenticator bit (bit-4) to 1.

19. The method of claim 11, wherein the indicator for the Authenticator message and the nonce are transmitted in a grouped AVP within the Answer message.

20. The method of claim 11, wherein the first hash result is encrypted within the Authenticator message.

* * * * *